US009130734B1

(12) United States Patent
Jones et al.

(10) Patent No.: US 9,130,734 B1
(45) Date of Patent: Sep. 8, 2015

(54) MULTI-TONE CONCATENATED SPREAD SPECTRUM COMMUNICATIONS

(75) Inventors: William W. Jones, Aliso Viejo, CA (US); Gilberto Isaac Sada, Irvine, CA (US)

(73) Assignee: Interstate Electronics Corporation, Anaheim, CA (US)

( * ) Notice: Subject to any disclaimer, the term of this patent is extended or adjusted under 35 U.S.C. 154(b) by 354 days.

(21) Appl. No.: 12/850,500

(22) Filed: Aug. 4, 2010

Related U.S. Application Data

(60) Provisional application No. 61/231,453, filed on Aug. 5, 2009.

(51) Int. Cl.
| | |
|---|---|
| H04L 5/00 | (2006.01) |
| H04B 7/216 | (2006.01) |
| H04L 5/02 | (2006.01) |
| H04B 1/707 | (2011.01) |
| H04L 1/00 | (2006.01) |

(52) U.S. Cl.
CPC ............... H04L 5/026 (2013.01); H04B 1/707 (2013.01); H04L 1/0071 (2013.01)

(58) Field of Classification Search
CPC .. H04B 7/216; H04B 7/2628; H04B 2001/69; H04B 1/707; H04L 5/026; H04L 5/0007; H04L 5/0021; H04L 1/0071; H04J 13/00
See application file for complete search history.

(56) References Cited

U.S. PATENT DOCUMENTS

| | | | |
|---|---|---|---|
| 5,103,459 A | 4/1992 | Gilhousen et al. | |
| 5,325,394 A | 6/1994 | Bruckert | |
| 5,550,809 A * | 8/1996 | Bottomley et al. | ........... 370/342 |
| 5,559,829 A | 9/1996 | Le Strat et al. | |
| 6,108,327 A | 8/2000 | Schilling et al. | |
| 6,128,332 A | 10/2000 | Fukawa et al. | |
| 6,141,373 A | 10/2000 | Scott | |
| 6,181,729 B1 | 1/2001 | O'Farrell | |
| 6,747,948 B1 * | 6/2004 | Sarraf et al. | ................... 370/210 |
| 7,158,474 B1 | 1/2007 | Gerakoulis | |
| 7,873,097 B1 | 1/2011 | Luecke et al. | |
| 2003/0193889 A1 * | 10/2003 | A. Jacobsen | ................... 370/208 |
| 2004/0066838 A1 * | 4/2004 | Choi et al. | ..................... 375/146 |
| 2004/0066839 A1 * | 4/2004 | Choi et al. | ..................... 375/146 |
| 2004/0071200 A1 * | 4/2004 | Betz et al. | ..................... 375/152 |
| 2004/0085919 A1 * | 5/2004 | Song et al. | ..................... 370/320 |
| 2004/0105489 A1 | 6/2004 | Kim et al. | |

(Continued)

OTHER PUBLICATIONS

Ghassan Kawas Kaleh; Frequency-Diversity Spread-Spectrum Communication System to Counter Bandlimited Gaussian Interference; IEEE Transactions on Communications; Jul. 1996; vol. 44, No. 7, Institute of Electrical and Electronics Engineers, New York City; pp. 886-893.

(Continued)

Primary Examiner — Aristocratis Fotakis
(74) Attorney, Agent, or Firm — Knobbe Martens Olson & Bear LLP

(57) ABSTRACT

Apparatus and methods spread input symbols for transmission in multiple dimensions. When input symbols are spread over time, frequency, and code space, the resulting symbols exhibit good immunity to interference. In one embodiment, a system with a multi-tone outer code/modulation and a direct sequence spread spectrum (DSSS) inner code/modulation provides good communications performance characteristics and can be efficiently implemented.

35 Claims, 8 Drawing Sheets

(56) References Cited

U.S. PATENT DOCUMENTS

| | | | |
|---|---|---|---|
| 2004/0264585 A1* | 12/2004 | Borran et al. | 375/260 |
| 2005/0135493 A1* | 6/2005 | Maltsev et al. | 375/260 |
| 2006/0274710 A1* | 12/2006 | Lim et al. | 370/342 |
| 2007/0053449 A1* | 3/2007 | Adachi | 375/260 |
| 2007/0121666 A1* | 5/2007 | Kim et al. | 370/461 |
| 2007/0253476 A1* | 11/2007 | Tirkkonen et al. | 375/230 |
| 2008/0031369 A1* | 2/2008 | Li et al. | 375/260 |
| 2009/0323766 A1 | 12/2009 | Wang et al. | |
| 2010/0189162 A1* | 7/2010 | Yoshimoto et al. | 375/141 |

OTHER PUBLICATIONS

Rahman, et al.; Noncoherent MT-CDMA System with Post-Detection Diversity Combining; Canadian Journal of Electrical and Computer Engineering; Apr. 2003; vol. 28, No. 2, Institute of Electrical and Electronics Engineers, Canada; pp. 81-88.

Yee, et al.; Multi-Carrier CDMA in an Indoor Wireless Radio Channel [online]; Jan. 1, 1994 [retrieved on Apr. 23, 2012]. Retrieved from the Internet: <URL: http://www.eecs.berkeley.edu/Pubs/TechRpts/1994/ERL-94-6.pdf>; University of California at Berkeley, Berkeley, California.

Zhou, et al.; Digital Multi-Carrier Spread Spectrum Versus Direct Sequence Spread Spectrum for Resistance to Jamming and Multipath; IEEE Transactions on Communications; Apr. 2002; vol. 50, No. 4, Institute of Electrical and Electronics Engineers, New York City; pp. 643-655.

USPTO; Office Action dated Jun. 15, 2010, from related application U.S. Appl. No. 11/858,760, filed Sep. 20, 2007.

Mizutani, et al., "Design of Pseudo-Noise Sequences for a Spread Spectrum Communication and Ranging System," Proceedings of the IEEE Intelligent Vehicles Symposium, 2000. IV 2000, Publication Year: 2000, Institute of Electrical and Electronics Engineers; pp. 418-423.

Fong, et al., "Concatenated Orthogonal/PN Spreading Sequences and Their Application to Cellular DS-CDMA Systems with Integrated Traffic," IEEE Journal on Selected Areas in Communications, Apr. 1996, vol. 14, Issue: 3, Institute of Electrical and Electronics Engineers, pp. 547-558.

Cacopardi, et al., "New Concatenated Sequences for Wireless Indoor Asynchronous DS-CDMA Communications," 1996 IEEE International Conference on Communications, 1996, ICC 96, Conference Record, Converging Technologies for Tomorrow's Applications, vol. 1. Publication Year: 1996, Institute of Electrical and Electronics Engineers, pp. 63-67. vol. 1.

Said E. El-Khamy, "Matched Spread Spectrum Techniques," MILCOM 1982 IEEE Military Communications Conference—Progress in Spread Spectrum Communications, 1982 vol. 1. Publication Year: 1982, pp. 15.6-1-15.6-5.

Maskara, et al., "Concatenated Sequences for Spread Spectrum Systems," IEEE Transactions on Aerospace and Electronic Systems, vol. AES-17, Issue: 3, May 1981, Institute of Electrical and Electronics Engineers, pp. 342-350.

Elders-Boll, et al., "Interference Parameters of Concatenated Spreading Sequences for Asynchronous CDMA," 1996, IEEE 4th International Symposium on Spread Spectrum Techniques and Applications Proceedings, vol. 3, Publication Year: 1996, Institute of Electrical and Electronics Engineers, pp. 960-964.

Kurskii, et al., "Development of the Approaches to UMTS Requirements in the CTDMA Radio Interface" Proceedings of the 1998 IEEE 5th International Symposium on Spread Spectrum Techniques and Applications, 1998. vol. 2, Publication Year: 1998, Institute of Electrical and Electronics Engineers, pp. 634-638.

Mizutani, et al., "Inter-Vehicle Spread Spectrum Communication and Ranging System with Concatenated EOE Sequence," IEEE Transactions on Intelligent Transportation Systems, vol. 2, Issue: 4, Dec. 2001, Institute of Electrical and Electronics Engineers, pp. 180-191.

Elders-Boll, et al., "Fast Acquisition in DS-CDMA using Concatenated Spreading Sequences," 1997 First IEEE Signal Processing Workshop on Signal Processing Advances in Wireless Communications, Publication Year: 1997, Institute of Electrical and Electronics Engineers, pp. 373-376.

Mizutani, et al., "Performance Evaluation of Spread Spectrum Communication and Ranging System with Interference from Other Vehicles," IEEE Intelligent Vehicle Symposium, 2002 vol. 2, Publication Year: 2002, Institute of Electrical and Electronics Engineers, pp. 378-386. vol. 2.

Elders-Boll, et al., "Mismatched-Filtering of Concatenated Spreading Sequences for Approximately Synchronized CDMA-Systems," IEEE 46th Vehicular Technology Conference, 1996 Mobile Technology for the Human Race, vol. 3, Publication Year: 1996, Institute of Electrical and Electronics Engineers pp. 1727-1731.

High Rate Ultra Wideband PHY and MAC Standard, ECMA International [online], Dec. 2008 [retrieved on Sep. 22, 2014]. Retrieved from the Internet: <URL: http://www.ecma-international.org/publications/files/ECMA-ST/ECMA-368.pdf>, pp. 61-88, $3^{rd}$ Edition, Standard, Geneva, Switzerland.

* cited by examiner

MULTI-TONE CONCATENATED SPREAD SPECTRUM COMMUNICATIONS

CROSS-REFERENCE TO RELATED APPLICATION

This application claims the benefit under 35 U.S.C. §119(e) of U.S. Provisional Application No. 61/231,453, filed Aug. 5, 2009, titled "Multi-tone Concatenated Spread Spectrum" the entirety of which is hereby incorporated by reference.

This application is related to copending and commonly-owned application titled "Systems and Methods for Concatenation in Spread Spectrum Systems," Ser. No. 11/858,760, filed on Sep. 20, 2007, issued as U.S. Pat. No. 7,873,097 on Jan. 18, 2011, the disclosure of which is hereby incorporated by reference in its entirety herein.

BACKGROUND

1. Field of the Invention

The invention generally relates to electronics, and in particular, to communications systems.

2. Description of the Related Art

Desirable characteristics of a communications technology are near capacity data rate, flexibility, reliability, robustness to interference, co-existence with other systems, etc. A relatively important characteristic of a communications waveform required to exhibit these characteristics is high dimensionality. For example, a wideband orthogonal frequency division multiplexed (OFDM) system has high dimensionality in frequency. Shannon's theory derives capacity as dimensionality goes to infinity (water filling analogy).

Highly dimensional systems can have more inherent flexibility with regard to how capacity is allocated. Similar benefits are applicable for highly dimensional systems for interference tolerance, coexistence and other desirable properties. An arbitrary application of the concept of dimensionality does not necessarily yield a good waveform. While an OFDM system with a large number of tones can exhibit very good jamming resistance in the presence of narrowband jammers, each tone can be affected by an impulse jammer. It is therefore desirable to incorporate dimensionality on multiple axes: time, frequency, and code space (code space is not independent from the other two in a strict sense but from a functional perspective it is useful to consider separately).

SUMMARY

One embodiment includes a method of spreading input data in both a frequency dimension and a time dimension to generate a multi-tone concatenated spread spectrum signal, wherein the method includes: modulating a plurality of the input data streams to generate a plurality of digitally modulated symbol streams; spreading each digitally modulated symbol stream with a spread sequence to generate a plurality of spread symbol streams; rearranging symbols of the plurality of spread symbol streams to generate an interleaved plurality of spread symbol streams; mapping blocks of interleaved streams to particular subcarrier bins; and transforming blocks of interleaved symbol streams from a frequency domain of the subcarrier bins to time domain to generate the multi-tone concatenated spread spectrum (MT-CSS) signal; wherein at least modulating and spreading are performed by electronic hardware.

One embodiment includes an apparatus for spreading input data in both a frequency dimension and a time dimension to generate a multi-tone concatenated spread spectrum signal, wherein the apparatus includes: one or more digital modulators configured to digitally modulate symbol streams; one or more inner code spread spectrum modulators configured to spread the digitally modulated symbol streams to generate plurality of spread digitally modulated symbol streams; an interleaver configured to interleave the plurality of spread symbol streams to generate a plurality of interleaved symbol streams, wherein the interleaver is further configured to map blocks of interleaved streams to particular subcarrier bins; and an inverse discrete Fourier Transform processor configured to transform blocks of interleaved symbol streams from a frequency domain of the subcarrier bins to generate the multi-tone concatenated spread spectrum (MT-CSS) signal.

One embodiment includes a method of despreading a multi-tone concatenated spread spectrum sequence signal that has been spread in both frequency and time, wherein the method includes: receiving the multi-tone concatenated spread spectrum sequence signal (MT-CSS); transforming symbols from frequency domain to time domain to separate a plurality of interleaved data streams from the MT-CSS signal; de-interleaving the plurality of discrete Fourier transform output bins to generate a plurality of spread symbol streams; de-spreading the plurality of spread symbol streams using a replica code to generate a plurality of digitally modulated symbol streams; and demodulating the digitally modulated symbol streams into one or more data streams.

One embodiment includes an apparatus for despreading a multi-tone concatenated spread spectrum sequence (MT-CSS) signal, wherein the apparatus includes: a discrete Fourier Transform processor configured to calculate a discrete Fourier Transform of the MT-CSS signal to generate a plurality of spread symbol streams; a de-interleaver configured to reorganize the plurality of discrete Fourier transform output bins to form a plurality of spread symbol streams; a de-spreading decoder configured to despread the plurality of de-interleaved spread symbol streams to generate a plurality of modulated symbol streams; and demodulators configured to demodulate symbols streams into one or more data streams.

BRIEF DESCRIPTION OF THE DRAWINGS

These drawings and the associated description herein are provided to illustrate specific embodiments of the invention and are not intended to be limiting.

DETAILED DESCRIPTION OF SPECIFIC EMBODIMENTS

Figure 1:
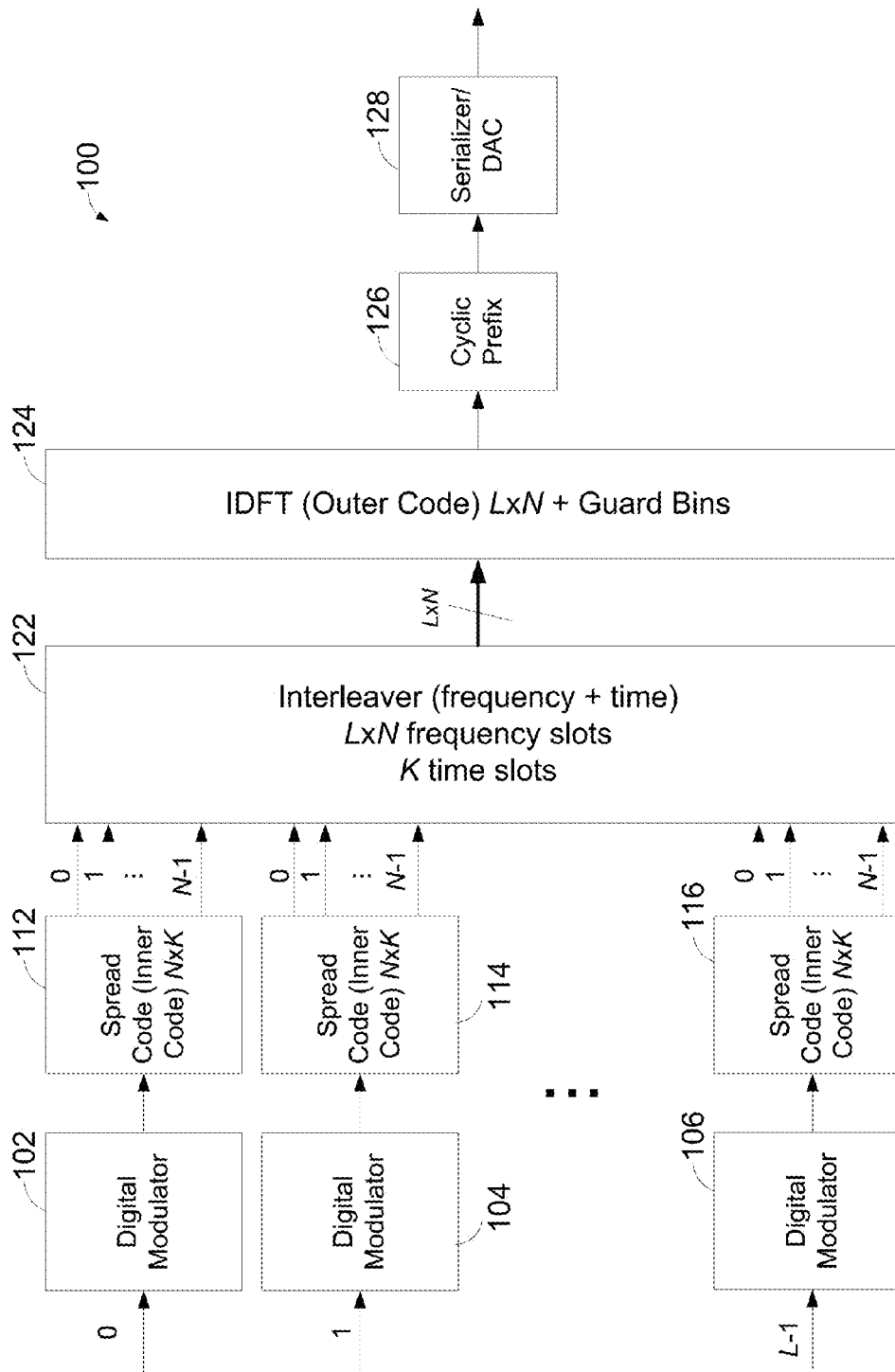
FIG. 1 illustrates an example of a transmitter of an MT-CSS system (upconverter, power amplifier, and antenna not shown).

Concatenated systems offer significant advantages in minimizing implementation complexity, particularly for highly dimensional systems. Further, the implementation of outer code/modulation in the analog domain can provide a significant reduction in hardware cost and power consumption. In one embodiment, a system with a multi-tone outer code/modulation and a direct sequence spread spectrum (DSSS) inner code/modulation provides a relatively good approach to maximizing the desired communications performance characteristics in an efficient implementation.

Although particular embodiments are described herein, other embodiments of the invention, including embodiments that do not provide all of the benefits and features set forth herein, will be apparent to those of ordinary skill in the art. To avoid repetition of description, components having the same or similar function are referenced by the same reference number.

One embodiment of the system is implemented with a field-programmable gate array (FPGA) platform. However, application specific integrated circuits (ASICs), discrete logic, programmable logic devices (PLDs) or the like can also be used. The system has robust performance against a broad range of jammers by operating in a high jamming to signal ratio (J/S) regime for tone (narrow/partial band) and impulse (wideband) jammers. In addition, in some embodiments, a portion of a system can be implemented in hardware and another portion in firmware/software. Instructions for the software/firmware can be stored in a tangible, computer-readable medium, and executed with a processor, such as a microprocessor or a programmable digital signal processor.

In common with the inner code described in related copending and commonly-owned application titled SYSTEMS AND METHODS FOR CONCATENATION IN SPREAD SPECTRUM SYSTEMS, Ser. No. 11/858,760, filed on Sep. 20, 2007, the inner code of the MT-CSS system is DSSS. The spreading code can be a pseudorandom noise (PN or PRN) sequence, Gold code, Walsh-Hadamard code, Golay code pair or a combination of such sequences. The inner code provides dimensionality in time. In contrast to the outer code described in related and copending and commonly-owned application titled SYSTEMS AND METHODS FOR CONCATENATION IN SPREAD SPECTRUM SYSTEMS, Ser. No. 11/858,760, filed on Sep. 20, 2007, the outer processing of the MT-CSS system is achieved through a multi-tone processor, which can be implemented efficiently using a discrete Fourier transform algorithm (such as an FFT algorithm, for example, Cooley-Tukey, Winograd, etc.).

As will be explained in greater detail later, one or more modulated input sources provide data to an associated inner code spreading sub-block. The inner code spreading sub-block spreads the data over at least the frequency dimension by spreading the resulting code chips across the N subcarrier bins. In one embodiment, the inner code spreading sub-block spreads the signal in two dimensions. In one embodiment, a spreading code is used to spread the input signal across multiple IDFT subcarriers. In one embodiment, a second spreading code is used to spread the input signal across each subcarrier's time index. In one embodiment, the spread data is assigned to one or more IDFT subcarriers through the use of an interleaver.

Transmitter

An example of a transmitter 100 of an MT-CSS system (power amplifier and antenna not shown) is illustrated in FIG. 1.

The transmitter 100 of the MT-CSS system spreads data in two dimensions: time and frequency. The input data is provided as an input to digital modulators 102, 104, 106, then spread by spread code encoders 112, 114, 116, then interleaved by an interleaver 122, then an IDFT process 124 is performed, then a cyclic prefix 126 is added, and then the resulting signal is serialized and converted to analog 128 for transmission as explained in greater detail as follows.

The parameter L represents the number of input data streams. The input data streams can be derived from a single data stream as illustrated later in connection with FIG. 5. The value of L is one or more. The parameter N represents the number of subcarrier bins of an IDFT or DFT per input data stream. The value of N does not have to be the same for each input data stream. The product of L and N (LxN) plus any optional guard bins corresponds to the total number of subcarrier bins. The product of N and K (NxK) represents the number of code chips per input symbol. Accordingly, the value of each of N and K can be one or more, and each input symbol can be one or more bits. In addition, pilot signals can also be used and can occupy one or more frequency slots.

Inputs 0 to L−1 provide input data to digital modulators 102, 104, 106. The particular modulation technique used to modulate input sources can vary. For example, modulators for quadrature amplitude modulation (QAM), such as M-QAM, modulators for phase shift keying, such as QPSK, BPSK, and the like can be used. Multiple streams of data can be present. For example, in the case of a 16-QAM modulator, a 16-QAM digital modulator can accept two streams of data for an in-phase input and two streams of data for a quadrature-phase input. In addition, the digital modulators 102, 104, 106 of a particular embodiment do not have to use a common modulation technique.

The outputs of the input source modulators 102, 104, 106 are provided as inputs to the spread code encoders 112, 114, 116 labeled Spread Code (Inner Code) NxK, wherein N represents the spreading of the code chips across N IDFT subcarrier bins, and K represents the time spreading of the code chips across K blocks of the N IDFT subcarrier bins so that each symbol input to the spread code encoders 112, 114, 116 is spread over the product of N (frequency) and K (time). Each resulting encoded spread symbol is referred to as the "inner code." In one embodiment, Gold codes are used to spread across N IDFT subcarrier bins; the spreading code can alternatively be accomplished through a pseudorandom noise (PN or PRN) sequence, Walsh-Hadamard code, Golay code pair, or the like, or a combination of the foregoing. In addition, the particular spread code of the spread code encoders 112, 114, 116 can vary among the spread code encoders of a particular embodiment. The spread code encoders 112, 114, 116 can also be referred to as DSSS encoders.

After spreading by the spread code encoders 112, 114, 116, the spread code chips are re-organized by the interleaver 122. The distribution of the symbols among the IDFT bins spreads out the symbols over subcarrier bins selected by the interleaver 122. For example, the N outputs of a particular spread code encoder can be, but do not have to be, encoded onto N adjacent IDFT subcarrier bins. In one example, the interleaver 122 selects the particular subcarrier bins to use based on interference conditions. For example, interference can be sensed by a controller which can be part of the interleaver 122 or part of another control. After spreading and interleaving, the data may be further (in addition to the spreading over K blocks) spread over time through multiple IDFT frames.

The interleaver 122 rearranges the symbol streams of the spread code encoders 112, 114, 116 into the selected IDFT bins. In one embodiment, the interleaver 122 arranges and assigns the spread code to the IDFT processor 124.

Guard bins can optionally be used in the multicarrier modulation technique to decrease adjacent symbol carrying bin power leakage, or to avoid certain frequencies that will suffer more than others given the type of communication channel used. For example, if it is determined that a particular frequency channel is suffering from interference, then the channel can be disabled and turned into a guard bin. Such guard bins can be utilized in MT-CSS systems with or without the use of orthogonal frequencies.

The IDFT processor 124 performs an inverse discrete Fourier transform (for example, inverse Fast Fourier transform) of the spreaded and interleaved code. The output generated is a time-domain signal based on the modulated, spread encoded, and interleaved symbols, so the spread symbols correspond to one or more frequency bins of an IFFT or IDFT processor. This output is a baseband version of an MT-CSS signal.

A cyclic prefix block 126 is appended to the blocks of the time domain symbols after the IDFT processor 124, to aid the receiver in the recovery from channel multipath and latency. A serializer/DAC 128 prepares the symbols for transmission by, for example, by converting the block of IFFT cyclic prefixed symbols to a serial stream of symbols and by converting from digital to analog for transmission. Further upconversion and power amplification are not shown in FIG. 1. After upconversion and power amplification, the resulting signal remains an MT-CSS signal, but in a radio frequency version.

Receiver

Figure 2:
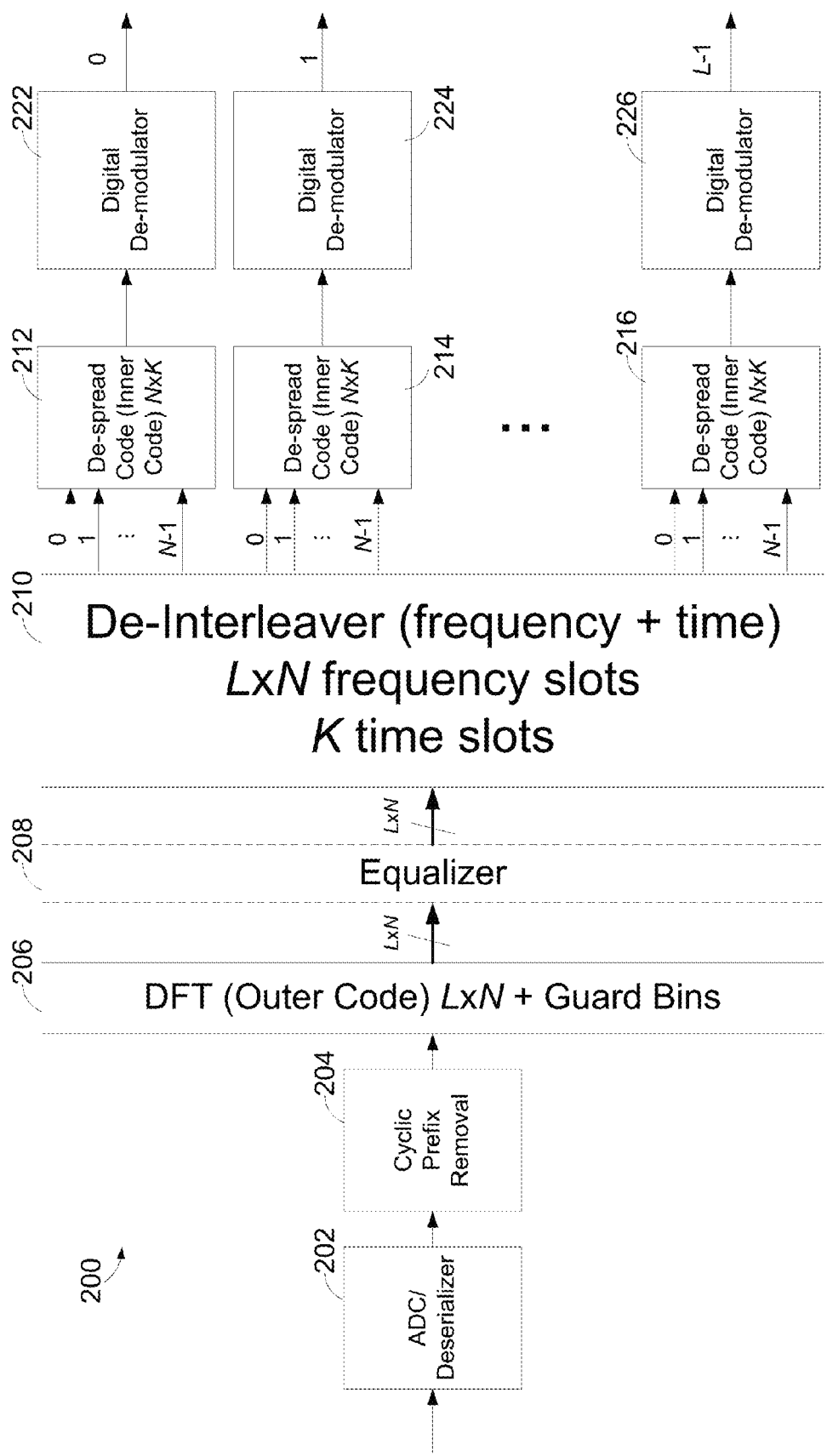
FIG. 2 illustrates an example of a receiver for an MT-CSS system (antenna and downconverter not shown).

After upconversion and transmission through a transmission channel (such as transmitted through air via an antenna), the RF version of the MT-CSS signal is received by a receiver. FIG. 2 illustrates an example of a receiver 200 for an MT-CSS system. An antenna (not shown), a receiver front-end (not shown), and a downconverter (not shown) receive the signal.

The ADC portion of the ADC/Deserializer block 202 converts the downconverted signal from analog to digital, and the deserializer portion buffers the serial stream of symbols into a block of symbols that can be appropriately processed by a DFT processor 206.

A cyclic prefix removal block 204 removes the cyclic prefix added during the transmission process. In one embodiment, the DFT processor 206 performs a Fast Fourier Transform on the incoming time-domain signal. A discrete Fourier Transform (DFT) can alternatively be computed, but computation of the Fast Fourier Transform (FFT) is typically more efficient. Other frequency detection techniques, such as the Goertzel algorithm, can alternatively be implemented and these other techniques will be readily determined by one of ordinary skill in the art. Each frequency bin (with spread symbols) computed by the DFT processor 206 decouples the subcarrier streams that were combined during the transmission process.

An optional equalizer block 208 disposed in the signal path between the DFT processor 206 and the de-interleaver 210 can compensate for gain and channel interference at one or more subcarriers. In response to interference, such as destructive interference as encountered during multipath, certain subcarriers can encounter fading, while other subcarriers can be unaffected. The equalizer block 208 can adjust the gain of one or more of the faded subcarriers. A wide variety of equalizers can be used, such as, but not limited to, mean square error (MSE), least squares estimation (LSE), zero forcing, blind, etc. Some of these equalizer types can also be used in combination with a reference to perform the gain adjustment.

A de-interleaver 210 reorganizes the output of the DFT processor 206 so as to reverse the operations performed by the transmitter interleaver 122 (FIG. 1). For example, the de-interleaver block 210 can provide the particular outputs of the DFT processor 206 to the appropriate de-spread code decoder 212, 214, 216. The DFT processor 206 reverses the frequency to time domain operation by the IDFT. The output of the IDFT processor 124 is a set of frequency modulated spreaded symbols. For the output of the DFT processor 206, the frequency modulation is reversed to retrieve spreaded symbols, one spread symbol element per DFT output bin. In the illustrated embodiment, an FFT is computed for the DFT. Conventional techniques for the acquisition of the subcarriers and the timing of the frame boundaries are applicable.

From an output of the DFT processor 206, the spreaded symbols may be out of the despreaded order as to be processed by a de-spread code decoder 212, 214, 216. The de-interleaver 210 regroups the spreaded symbol elements into the correct sequence for the de-spread code decoder 212, 214, 216. This regrouping done by the de-interleaver 210 may even require the capture of multiple DFT or FFT block outputs, such as when a symbol is spread over more than one block or even more than one frame.

The inner code de-spread code decoders 212, 214, 216 decode the spread code symbols to generate the despread symbols. In one embodiment, the de-spread code decoders 212, 214, 216 correspond to code-matched filters, integrator circuits, and acquisition and tracking circuits. Conventional techniques of acquisition, tracking, and despreading with a replica code are applicable. The acquisition of the inner code takes place after the outer code has been acquired. Conventional techniques for the acquisition of a DSSS spread code are applicable.

Digital demodulators 222, 224, 226 detect the original symbols according to the particular digital modulation technique (BPSK, QPSK, QAM, and the like) performed earlier during the transmission process. Conventional digital demodulation techniques can be utilized.

Benefits of MT-CSS

MT-CSS can be paired with powerful adaptive equalization techniques, as used with OFDM, to mitigate fading without the use of a RAKE structure in the radio receiver. However, given the time and frequency spread spectrum nature of MT-CSS, the MT-CSS transmission channel is far more impervious to both impulse and narrow/partial band jamming than traditional OFDM techniques.

Figure 3:
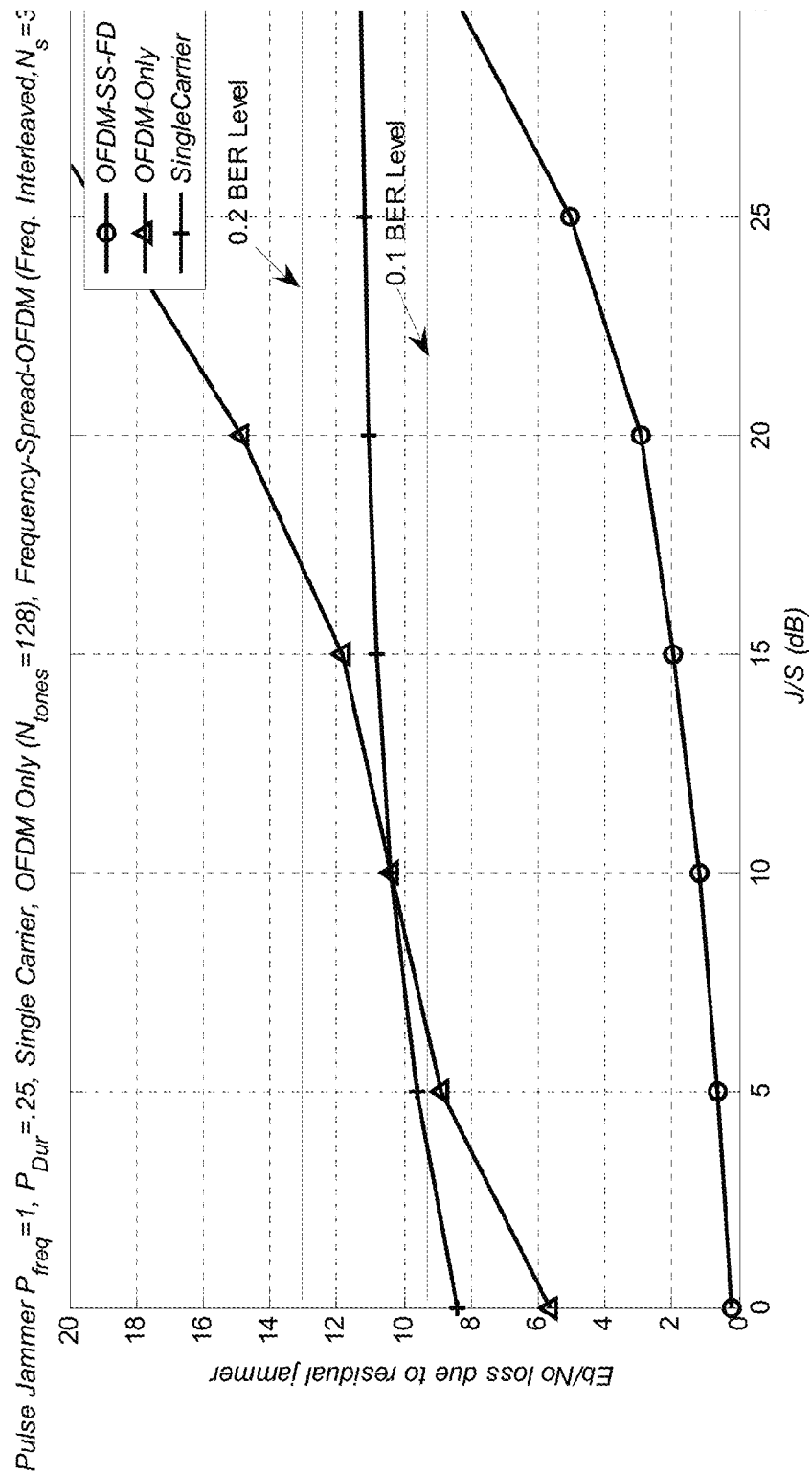
FIG. 3 is a chart illustrating simulated benefits of MT-CSS in the presence of a pulse or impulse jammers.
Figure 4:
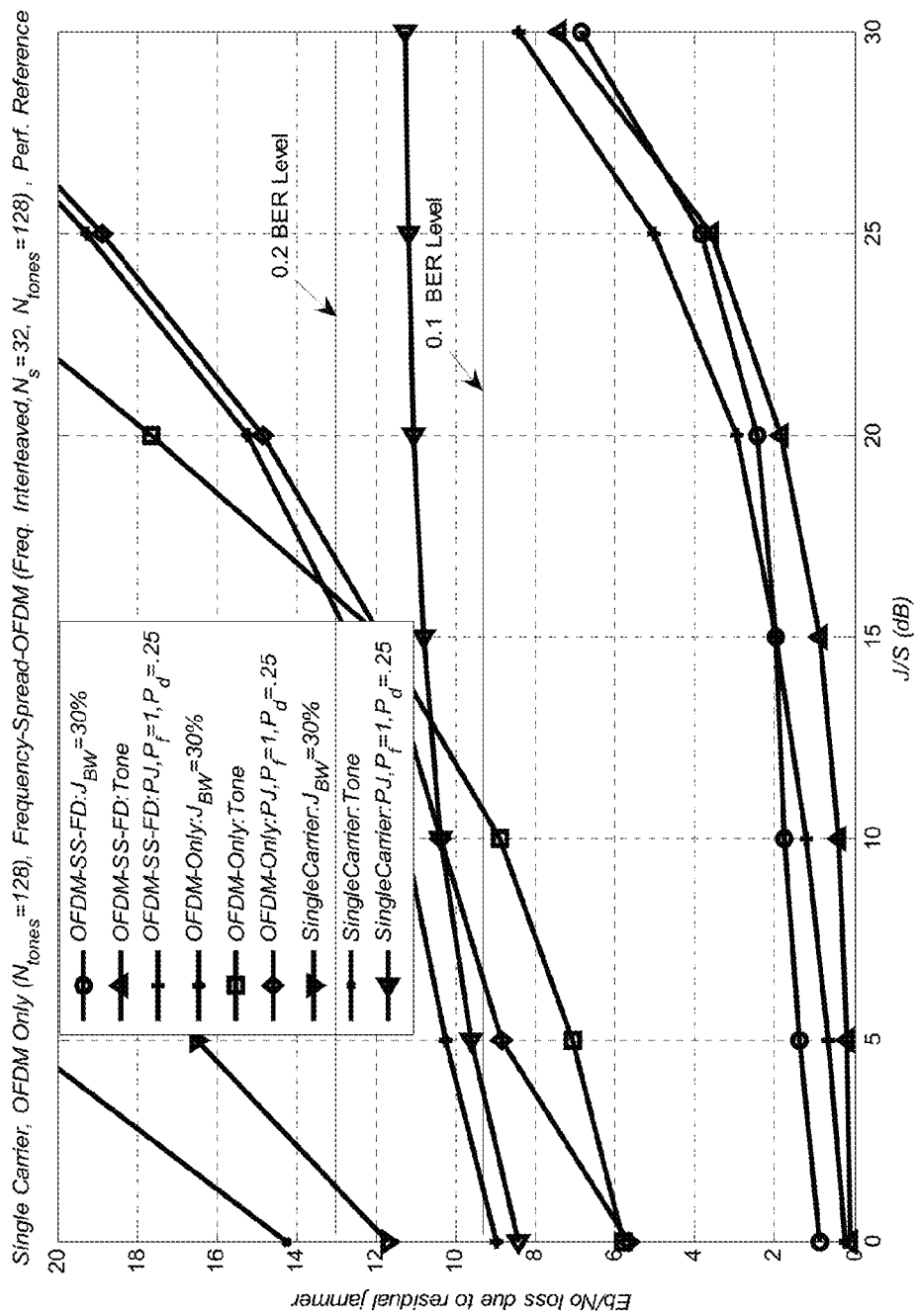
FIG. 4 is a chart illustrating simulated benefits of MT-CSS in the presence of narrow/partial band jammers.

FIGS. 3 and 4 illustrate simulated performance of MT-CSS in the presence of impulse and narrow/partial band jammers, respectively. (Note: in these plots MT-CSS is denoted OFDM-SS-FD).

In each of FIGS. 3 and 4, a jamming to signal ratio (J/S) in decibels (dB) is expressed along a horizontal axis with increasing J/S to the right, and a loss energy per bit to noise power spectral density ratio ($E_b/N_O$) is expressed along a vertical axis with increasing $E_b/N_O$ loss to the top. As illustrated by the simulation results of FIG. 3, the loss in $E_b/N_O$ in the presence of an impulse jammer for the MT-CSS case (labeled OFDM-SS-FD) is much less than the loss in $E_b/N_O$ for the conventional OFDM case. As illustrated by the simulation results of FIG. 4, the loss in $E_b/N_O$ in the presence of narrow/partial band jammers for the MT-CSS case (labeled OFDM-SS-FD) is much less than the loss in $E_b/N_O$ for the conventional OFDM case.

Figure 5:
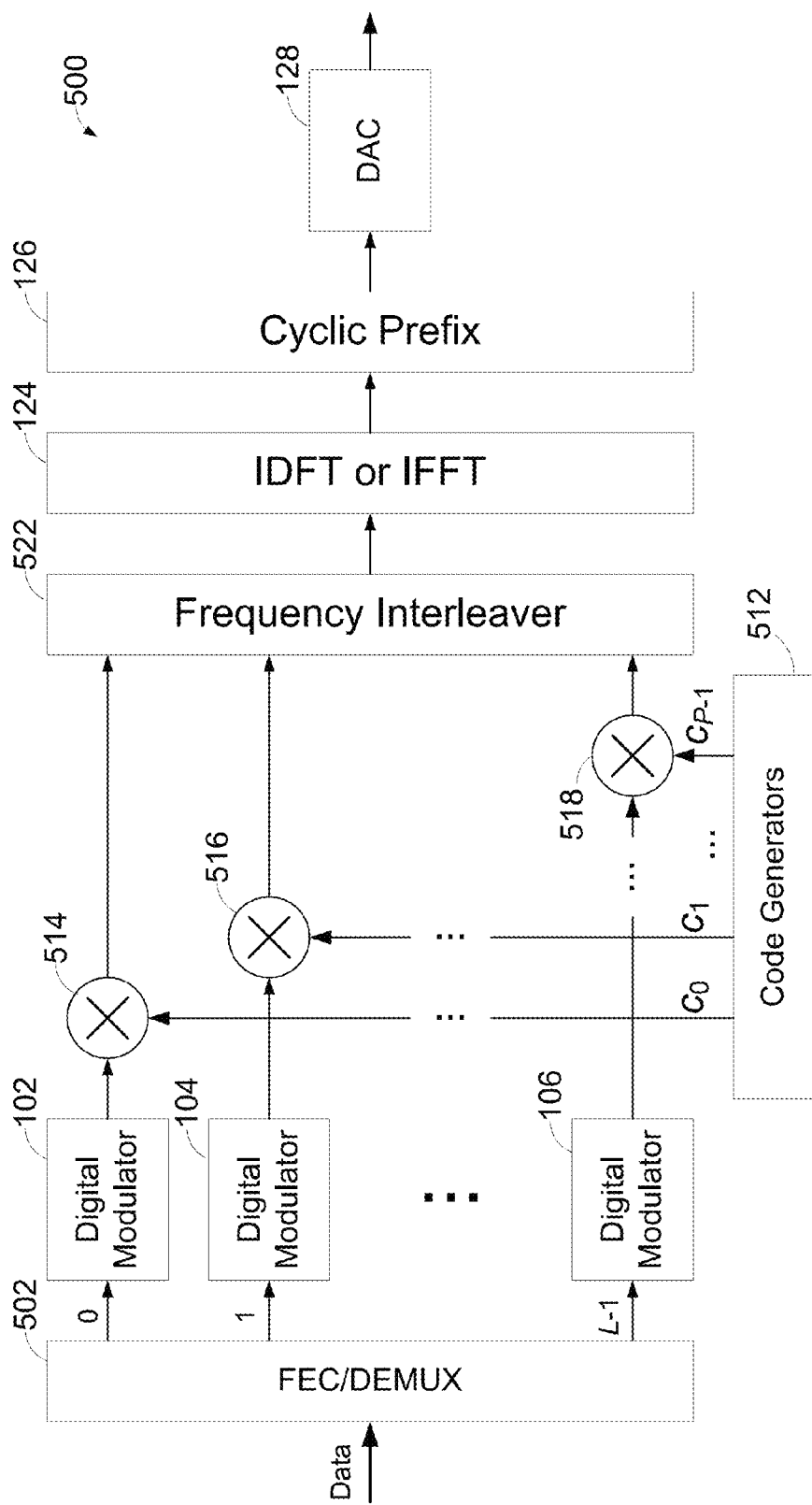
FIG. 5 illustrates another example of a transmitter portion of an MT-CSS system (upconverter, power amplifier, and antenna not shown).

FIG. 5 illustrates another example of a transmitter 500 of an MT-CSS system (upconverter, power amplifier, and antenna not shown). To avoid repetition of description, components that are common with the transmitter 100 described earlier in connection with FIG. 1 have the same reference numbers.

Data is provided as an input to an FEC/Demux block 502. A forward error correction (FEC) portion of the FEC/Demux block 502 optionally provides an error correction code, such as a block code, to be sent with the data to increase robustness. FEC techniques are well known in the art and can include, for example, convolutional codes. A demux or demultiplexer portion of the FEC/Demux block 502 separates the data, with or without the optional error correction codes, among L data streams, wherein L is 1 or more. The demux portion can include, for example, a serial to parallel converter, shift registers, and the like.

The L data streams are provided as inputs to digital modulators 102, 104, 106, which were described earlier in connection with FIG. 1. Outputs of each of the digital modulators 102, 104, 106 can be one or more bits wide as described earlier in connection with FIG. 1.

Spreading code encoders 514, 516, 518 generate spread data as outputs by combining the outputs of the digital modulators 102, 104, 106 with spread codes from the code generators 512. The spreading codes can be selected from one or more of a pseudorandom noise (PN or PRN) sequence, Gold code, Walsh-Hadamard code, Golay code pair or a combination of such sequences. In one embodiment, the spreading code encoders 514, 516, 518 correspond to exclusive-or (XOR) gates. Depending on whether the outputs of the digital modulators 102, 104, 106 are one or more bits wide, the number of code streams P can also vary. For example, the digital modulators 102, 104, 106 can modulate to I and Q streams. The value of P will be at least L and at least two for interleaving, but can be higher, such as 2 L.

The outputs of the spreading code encoders 514, 516, 518 are provided as inputs to a frequency interleaver 522. Without the frequency interleaver 522, the spread data from the spreading code encoders 514, 516, 518 would be assigned to particular subcarrier bins of the IDFT or IFFT processor 124. Via the operation of the frequency interleaver 522, the matching of the spread data streams to subcarrier bins is rearranged as will be described later in connection with FIG. 6. The IDFT processor 124, the cyclic prefix block 126, and the digital-to-analog converter block 128 can be as described earlier in connection with FIG. 1. For clarity, the upconverter, power amplifier, and antenna stages of a transmitter are not shown, but will be readily determined by one of ordinary skill in the art.

Figure 6:
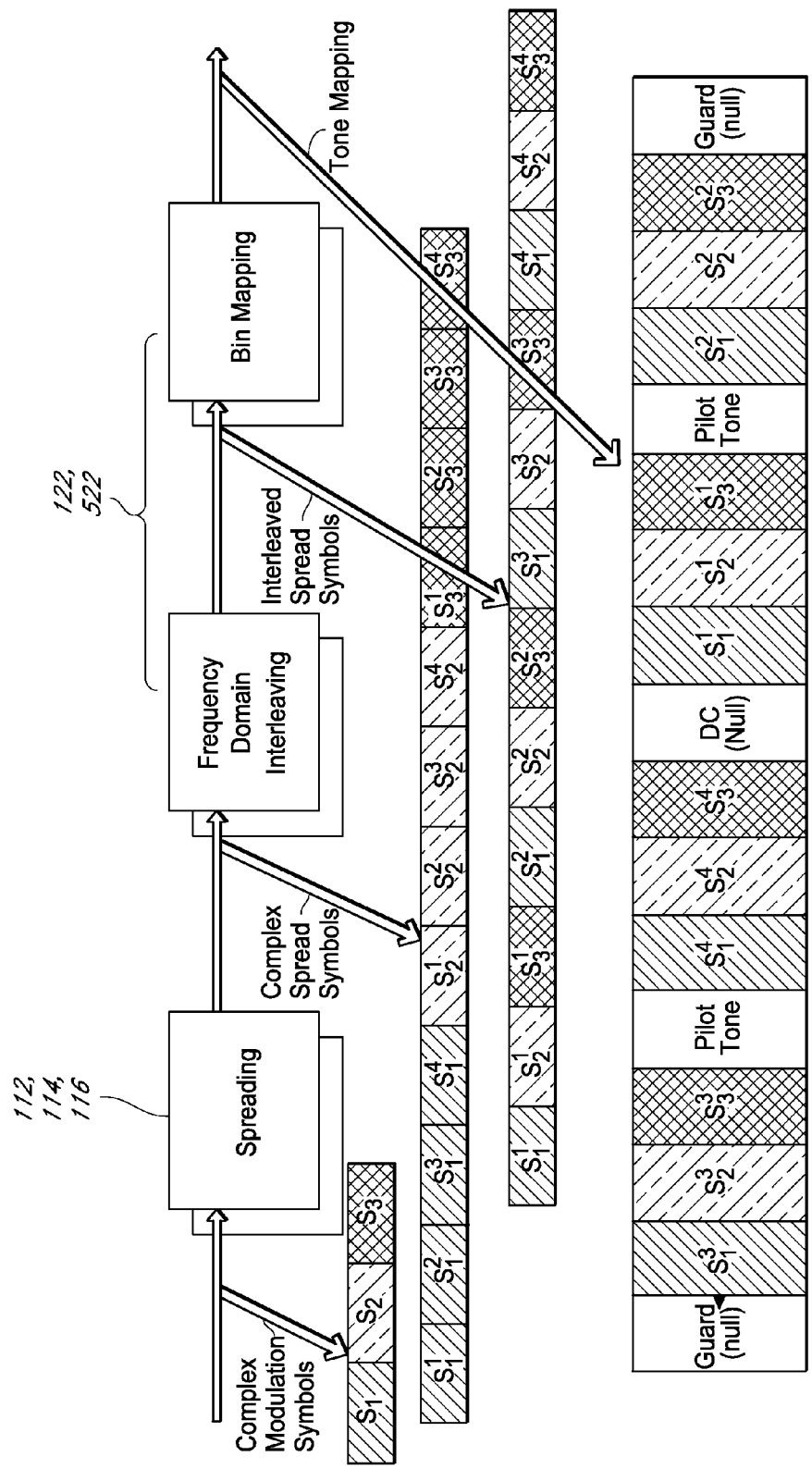
FIG. 6 illustrates an example of frequency interleaving.

FIG. 6 illustrates an example of frequency interleaving. Output symbols of the digital modulators 102, 104, 106 at a particular moment in time are illustrated as $s_1$, $s_2$, $s_3$, respectively. These symbols $s_1$, $s_2$, $s_3$ are spread by the spreading code encoders 514, 516, 518 into spread symbols $s_1^1$, $s_1^2$, $s_1^3$, $s_1^1$, $s_2^1$, $s_2^2$, $s_2^3$, $s_2^4$, $s_3^1$, $s_3^2$, $s_3^3$, $s_3^4$, respectively, wherein the subscript indicate the original symbol from which the spread symbol had originated, and the superscript indicates the particular spread symbol. In one embodiment, the spread symbol can be a code chip, but the modulation of the digital modulators 102, 104, 106 can be multi-dimensional. It will be understood that the number of spread symbols per input symbol can vary from that shown in the example.

The spread symbols are then interleaved by the interleaver 122, 522 so that spread symbols that originated from one symbol of $S_1$, $s_2$, $s_3$ are interleaved with spread symbols that originated from another of $S_1$, $s_2$, $s_3$ such that the order for spread symbols changes to $s_1^1$, $s_2^1$, $s_3^1$, $s_1^2$, $s_2^2$, $s_3^2$, $s_1^3$, $s_2^3$, $s_3^3$, $s_1^4$, $s_2^4$, $s_3^4$. In addition, the interleaver 122, 522 can select which subcarrier bins to use for particular spread symbols. The designation of a particular subcarrier bin can also change over time based on, for example, interference conditions.

Figure 7:
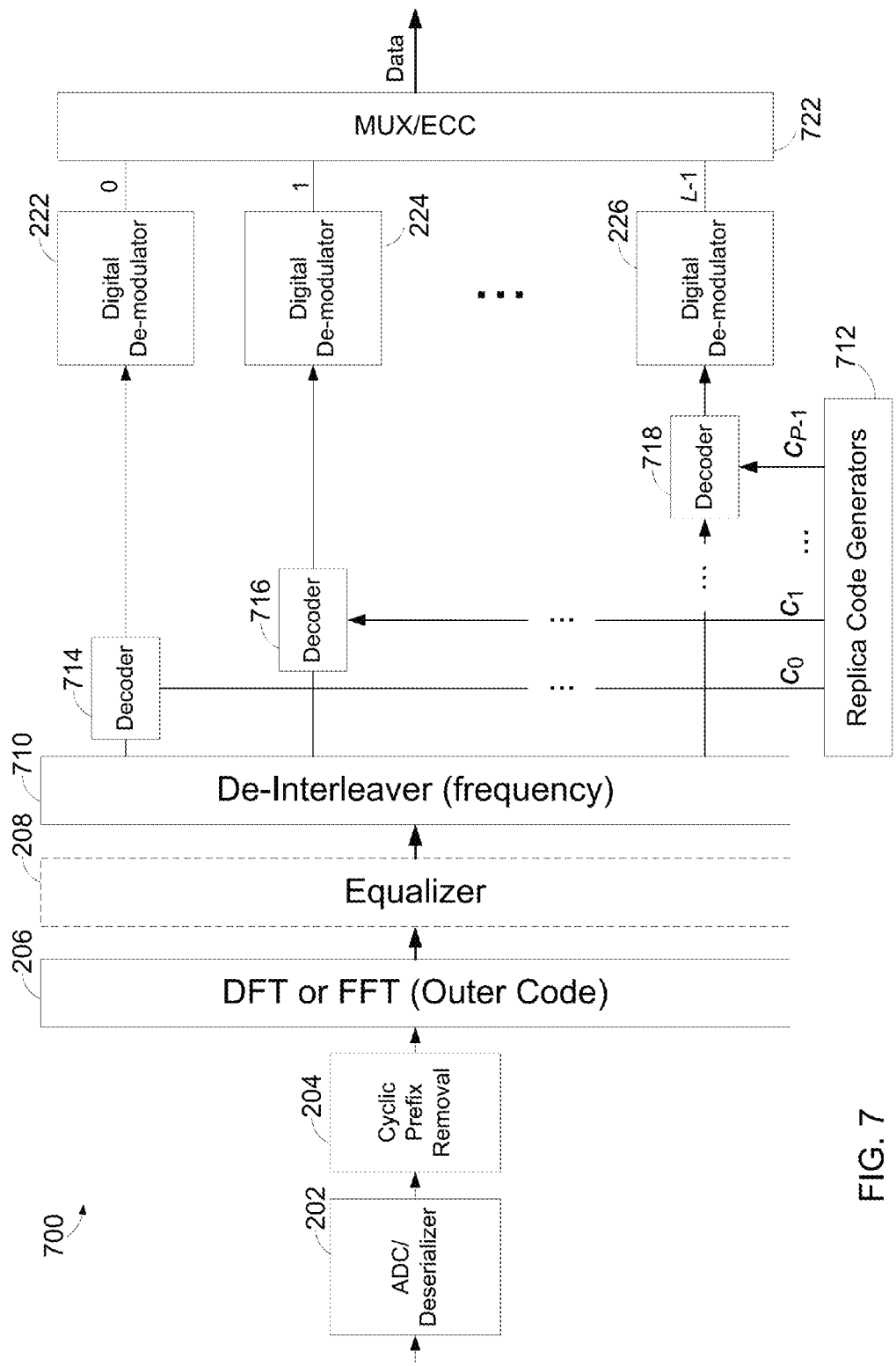
FIG. 7 illustrates another example of a receiver for an MT-CSS system (antenna and downconverter not shown).

FIG. 7 illustrates another example of a receiver 700 for an MT-CSS system (antenna and downconverter not shown). To avoid repetition of description, components that are common with the receiver 200 described earlier in connection with FIG. 2 have the same reference numbers. The equalizer 208 is again optional.

A de-interleaver 710 reverses frequency bin shifting and interleaving performed earlier by the frequency interleaver 522 (FIG. 5). The decoders 714, 716, 718 despread the spreaded symbols to generate the symbols. A replica code generator 712 generates replicas of the codes previously used to spread the data. The decoders 714, 716, 718 can include, for example, code matched filters, acquisition circuits, code tracking loops and the like. The decoders 714, 716, 718 can control the timing of the codes from the replica code generators 712. The symbols from the decoders 714, 716, 718 are then provided as inputs to digital de-modulators 222, 224, 226 as described earlier in connection with FIG. 2. Outputs of the digital de-modulators 222, 224, 226 are recombined by a multiplexer portion of a MUX/ECC block 722. The multiplexer can include, for example, a parallel to serial converter. An optional error correction code decoder of the MUX/ECC block 722 can check for errors and correct errors. The resulting data is then provided as an output of the MUX/ECC block 722.

Figure 8:
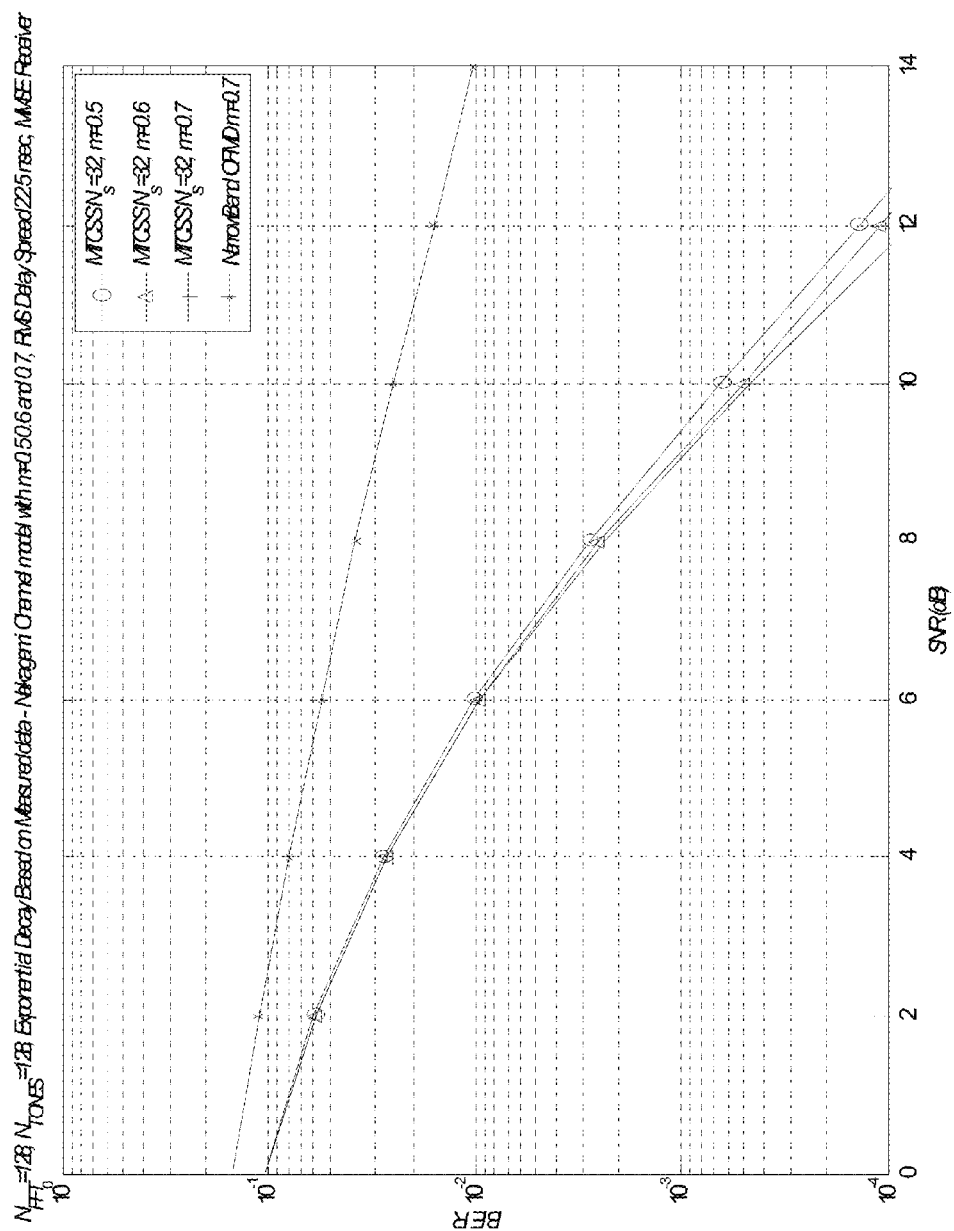
FIG. 8 is a chart illustrating simulated benefits of MT-CSS with respect to bit error rate (BER).

FIG. 8 is a chart illustrating simulated benefits of MT-CSS with respect to bit error rate (BER). In FIG. 8, a signal to noise ratio (SNR) in decibels (dB) is expressed along a horizontal axis with increasing SNR to the right, and bit error rate (BER) is expressed along a vertical axis with increasing BER to the top. As illustrated by the simulation results of FIG. 8, the BER improves with increasing SNR, and the BER is much lower for the MT-CSS examples than for the OFDM example.

The throughput of an MT-CSS system can be dynamically controlled based on the channel conditions by allocation of frequency bins and/or adjusting the amount of time spreading. The OFDM outer code facilitates spectral control such that the MT-CSS system can coexist (that is, does not interfere with) with other communications systems. Furthermore, forward error correction schemes can be combined with MT-CSS to further improve communication reliability.

Like most OFDM systems, MT-CSS can be readily implemented around a multiple access strategy such as time division multiple access (TDMA), frequency division multiple access (FDMA), and code division multiple access (CDMA) depending on the application. In addition, MT-CSS systems can be frequency division multiplexed to achieve even higher data rates.

An MT-CSS system can also readily integrate high precision ranging. In contrast to conventional DSSS, in an MT-CSS system, channel propagation delays translate to phase rotations in a frequency bin of the receiver. Integrating range estimates from all the frequency bins can yield a relatively precise range measurement. Together with the range information embedded in the code delay of the inner code, the MT-CSS system enables both short and long range measurements.

The various components of the transmitter and the receiver can be implemented by hardware, by firmware (software), or by a combination of both hardware and firmware.

The foregoing description and claims may refer to elements or features as being "connected" or "coupled" together. As used herein, unless expressly stated to the contrary, "connected" means that one element/feature is directly or indirectly connected to another element/feature, and not necessarily mechanically. Likewise, unless expressly stated to the contrary, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

As used herein, a "node" means any internal or external reference point, connection point, junction, signal line, conductive element, or the like at which a given signal, logic level, voltage, data pattern, current, or quantity is present. Furthermore, two or more nodes may be realized by one physical element (and two or more signals can be multiplexed, modulated, or otherwise distinguished even though received or provided as an output at a common node).

Various embodiments have been described above. Although described with reference to these specific embodiments, the descriptions are intended to be illustrative and are not intended to be limiting. Various modifications and applications may occur to those skilled in the art.

What is claimed is:

1. A method of spreading input data in both a frequency dimension and a time dimension to generate a multi-tone concatenated spread spectrum signal, the method comprising:
   spreading each of a plurality of digitally modulated symbol streams with a spreading sequence to generate a plurality of corresponding spread symbol streams comprising spread symbols;
   interleaving the spread symbols for each of the plurality of spread symbol streams to generate interleaved symbols;
   individually mapping each of the interleaved symbols to a particular subcarrier bin of a plurality of subcarrier bins such that the interleaved symbols are distributed across the plurality of subcarrier bins; and
   transforming the interleaved symbols from a frequency domain of the subcarrier bins to time domain to generate the multi-tone concatenated spread spectrum (MT-CSS) signal;
   wherein at least the spreading and the interleaving are performed by electronic hardware.

2. The method of claim 1, wherein transforming comprises computing inverse fast Fourier transforms.

3. The method of claim 1, further comprising selecting particular subcarrier bins to use based at least partly on at least one of interference conditions or jamming conditions.

4. The method of claim 1, further comprising mapping at least one of guard bins or pilot tones to particular subcarrier bins.

5. The method of claim 1, further comprising remapping assignment of the interleaved symbols to particular subcarrier bins in response to at least one of interference or jamming.

6. The method of claim 1, further comprising receiving the input data and allocating the input data among the plurality of input data streams with a demultiplexer.

7. The method of claim 1, further comprising appending a cyclic prefix to the MT-CSS signal to generate a modified MT-CSS signal.

8. The method of claim 1, further comprising converting the MT-CSS signal from digital to analog to generate an analog version of the MT-CSS signal.

9. The method of claim 1, further comprising:
   appending a cyclic prefix to the MT-CSS signal to generate a modified MT-CSS signal;
   converting the modified MT-CSS signal from digital to analog to generate an analog version of the MT-CSS signal;
   upconverting the analog version of the MT-CSS signal to generate an upconverted version of the MT-CSS signal; and
   power amplifying the upconverted version of the MT-CSS signal.

10. The method of claim 1, wherein the plurality of digitally modulated data streams comprise L digitally modulated data streams, wherein spreading further comprises spreading each digitally modulated symbol over N frequency slots and K time slots, and wherein rearranging further comprises interleaving such that L×N×K symbols are interleaved into K time slots and L×N frequency slots, wherein L, K, and N are each integers greater than 1.

11. An apparatus for spreading input data in both a frequency dimension and a time dimension to generate a multi-tone concatenated spread spectrum signal, the apparatus comprising:
    a plurality of inner code spread spectrum modulators configured to spread each of a plurality of digitally modulated symbol streams with a spreading sequence to generate a plurality of corresponding spread symbol streams comprising spread symbols;
    an interleaver configured to interleave the spread symbols for each of the plurality of spread symbol streams to generate interleaved symbols;
    wherein the interleaver is further configured to individually map each of the interleaved symbols to a particular subcarrier bin of a plurality of subcarrier bins such that the interleaved symbols are distributed across the plurality of subcarrier bins; and
    an inverse discrete Fourier Transform processor configured to transform the interleaved symbols from a frequency domain of the subcarrier bins to time domain to generate the multi-tone concatenated spread spectrum (MT-CSS) signal.

12. The apparatus of claim 11, wherein the inverse discrete Fourier Transform processor is configured to compute inverse fast Fourier transforms.

13. The apparatus of claim 11, wherein the interleaver is further configured to select particular subcarrier bins to use based at least partly on at least one of interference conditions or jamming conditions.

14. The apparatus of claim 11, wherein the interleaver is further configured to map at least one of guard bins or pilot tones to particular subcarrier bins.

15. The apparatus of claim 11, wherein the interleaver is further configured to remap assignment of the interleaved symbols to particular subcarrier bins in response to at least one of interference or jamming.

16. The apparatus of claim 11, further comprising a demultiplexer configured to receive input data and to allocate the input data among the plurality of input data streams.

17. The apparatus of claim 11, further comprising a cyclic prefix block configured to append a cyclic prefix to the MT-CSS signal to generate a modified MT-CSS signal.

18. The apparatus of claim 11, further comprising a digital-to-analog converter configured to convert the MT-CSS signal from digital to analog to generate an analog version of the MT-CSS signal.

19. The apparatus of claim 11, further comprising:
    a cyclic prefix block configured to append a cyclic prefix to the MT-CSS signal to generate a modified MT-CSS signal;
    a digital-to-analog converter configured to convert the modified MT-CSS signal from digital to analog to generate an analog version of the MT-CSS signal;
    an upconverter configured to upconvert the analog version of the MT-CSS signal to generate an upconverted version of the MT-CSS signal; and a power amplifier configured to amplify the upconverted version of the MT-CSS signal.

20. The apparatus of claim 11, wherein the plurality of digitally modulated symbol streams comprise L digitally modulated symbol streams, wherein each digitally modulated symbol is spread over N frequency slots and K time slots, wherein the interleaver is further configured to interleave L×N×K spread symbols into K time slots and L×N frequency slots, wherein L, K, and N are integers each greater than 1.

21. A method of despreading a multi-tone concatenated spread spectrum sequence (MT-CSS) signal that has been spread in both frequency and time, the method comprising:
receiving the MT-CSS signal;
transforming symbols from frequency domain to time domain to separate a plurality of interleaved data streams from the MT-CSS signal, wherein the plurality of interleaved data streams comprise transformed symbols;
de-interleaving the transformed symbols to generate a plurality of parallel de-interleaved spread symbol streams, wherein the number of parallel de-interleaved spread streams is the same as the number of interleaved data streams;
de-spreading each of the plurality of parallel de-interleaved spread symbol streams using a single replica code per parallel de-interleaved spread symbol stream to generate a plurality of digitally modulated symbol streams, wherein the single replica code is different for each of the parallel de-interleaved spread symbol streams, wherein the overall number of the plurality of parallel de-interleaved spread symbol streams is greater than the number of the plurality of digitally modulated symbol streams;
demodulating the digitally modulated symbol streams into two or more data streams; and
combining the two or more data streams into a single data stream.

22. The method of claim 21, wherein transforming comprises computing fast Fourier transforms.

23. The method of claim 21, further comprising removing a cyclic prefix from the MT-CSS signal prior to transforming symbols of the MT-CSS signal.

24. The method of claim 21, further comprising converting an analog version of the MT-CSS signal from analog to digital to generate the MT-CSS signal.

25. The method of claim 21, further comprising:
downconverting a radio frequency (RF) version of the MT-CSS signal to generate a downconverted version of the MT-CSS signal;
converting the downconverted MT-CSS signal from analog to digital to generate the MT-CSS signal; and
removing a cyclic prefix from the MT-CSS signal prior to transforming symbols of the MT-CSS signal.

26. The method of claim 21, further comprising equalizing one or more of the plurality of interleaved data streams to account for fading in one or more subcarriers corresponding to the interleaved data streams.

27. The method of claim 21, wherein transforming comprises computing discrete Fourier transforms.

28. An apparatus for despreading a multi-tone concatenated spread spectrum sequence (MT-CSS) signal, the apparatus comprising:

a discrete Fourier Transform processor configured to calculate a discrete Fourier Transform of the MT-CSS signal to generate transformed symbols from discrete Fourier transform output bins;
a de-interleaver configured to reorganize the transformed symbols to form a plurality of parallel de-interleaved spread symbol streams, wherein the number of parallel de-interleaved spread streams is the same as the number of interleaved data streams;
a de-spreading decoder configured to despread each of the plurality of parallel de-interleaved spread symbol streams with a single replica code per parallel de-interleaved spread symbol stream to generate a plurality of modulated symbol streams, wherein the single replica code is different for each of the parallel de-interleaved spread symbol streams, wherein the overall number of the plurality of parallel de-interleaved spread symbol streams is greater than the number of the plurality of digitally modulated symbol streams;
demodulators configured to demodulate the plurality of modulated symbol streams into two or more data streams; and
a parallel to serial converter configured to combine the two or more data streams into a single data stream.

29. The apparatus of claim 28, wherein the discrete Fourier Transform processor is configured to compute fast Fourier transforms.

30. The apparatus of claim 28, further comprising a cyclic prefix removal block configured to remove a cyclic prefix from the MT-CSS signal in a signal path prior to the discrete Fourier Transform processor.

31. The apparatus of claim 28, further comprising an analog-to-digital converter configured to convert an analog version of the MT-CSS signal from analog to digital to generate the MT-CSS signal.

32. The apparatus of claim 28, further comprising:
a downconverter configured to downconvert a radio frequency (RF) version of the MT-CSS signal to generate a downconverted version of the MT-CSS signal;
an analog-to-digital converter configured to convert the downconverted MT-CSS signal from analog to digital to generate the MT-CSS signal; and
a cyclic prefix removal block configured to remove a cyclic prefix from the MT-CSS signal in a signal path prior to the discrete Fourier Transform processor.

33. The apparatus of claim 28, further comprising an equalizer configured to equalize one or more of the plurality of interleaved data streams to account for fading in one or more subcarriers corresponding to the interleaved data streams.

34. The method of claim 21, further comprising equalizing one or more of the plurality of interleaved data streams using a mean square error, a least squares estimation, a zero forcing, or a blind equalizer.

35. The apparatus of claim 28, further comprising an equalizer configured to equalize one or more of the plurality of interleaved data streams, wherein the equalizer corresponds to a mean square error, a least squares estimation, a zero forcing, or a blind equalizer.

\* \* \* \* \*